2,960,503
PROCESS FOR PREPARING STEROIDAL 11-HY-
DROXY 18-CARBOXYLIC ACID LACTONES

Joseph Weinstock, Phoenixville, and Manfred E. Wolff, Elkins Park, Pa., assignors to Smith Kline & French Laboratories, Philadelphia, Pa., a corporation of Pennsylvania No Drawing. Filed Oct. 26, 1959, Ser. No. 848,561
12 Claims. (Cl. 260—239.57)

This invention relates to a new process for preparing steroidal lactones. More specifically, it relates to a novel process for preparing steroidal lactones having a carbon skeleton of 20 to 23 carbon atoms by the oxidation of an epoxide analogue having the same basic carbon skeleton as does the lactone, using ruthenium tetroxide as an oxidizing agent.

The process of this invention is particularly useful when applied to steroidal epoxides having a basic pregnane (19-nor-pregnane, allopregnane or 19-norallopregnane) nucleus containing a 5 or 6-membered epoxy moiety which possesses a free methylene, i.e., a secondary carbon atom, in a position adjacent to its oxygen atom. Advantageously an epoxy ring having 5 ring members with 4 carbon members, for example in a tetrahydrofuran moiety is present. Alternatively, a basic androstane or etiocholane nucleus can be present. Any optional nonreactive ring substituents can be present on the steroid nucleus such as halogen, methyl, keto, alkanoyloxy, etc. Reactive centers such as double bonds other ether groups or hydroxy groups can not be present during the reaction because of the reactivity of ruthenium tetroxide with these groups.

The reaction can be illustrated more specifically by the following reaction sequence:

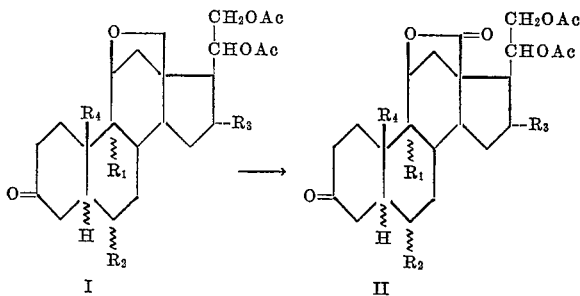

in which:

$R_1$ is hydrogen or fluoro, preferably $\alpha$;
$R_2$ is hydrogen methyl or fluoro, preferably $\alpha$;
$R_3$ and $R_4$ are hydrogen or methyl;
⦃ is either $\alpha$ or $\beta$, and
Ac is a lower alkanoyl of 2 to 7 carbon atoms inclusive.

The 11,18-epoxypregnanes of Formula I are oxidized at the 18-position i.e., the methylene moiety, by the process of this invention to yield the corresponding 11-hydroxypregnan-18-oic acid, 11,18-lactones of Formula II. The reaction is run with at least a stoichiometric amount of ruthenium tetroxide and preferably an excess of this reagent. The reaction solvent is any organic solvent in which the reactants are substantially soluble and unreactive. Ruthenium tetroxide is a strong oxidizing agent which reacts with many common solvents such as the alcohols, benzene and its derivatives, ethers etc. Especially preferred as solvents for the oxidation are halogenated, that is, the chlorinated or fluorinated, hydrocarbons of less than 6 carbon atoms which are liquid at the reaction temperature or at ambient temperature such as chloroform, carbon tetrachloride, ethylene dichloride, tetrachloroethylene, etc. Alternatively the liquid lower ester solvents of less than 6 carbon atoms such as ethyl acetate or propionate, the liquid paraffin solvents of less than 13 carbon atoms such as pentane or isooctane or the liquid ketones of less than 6 carbon atoms such as acetone or methyl ethyl ketone can be used.

The reaction is preferably run at about room temperature that is from about 25 to 50° C. however temperatures of from about 10° C. to 120° C. can be used. Usually the reaction runs from 12 to 24 hours but a range of from about 1 hour up to 36 hours gives substantial oxidation. As with most organic reactions the length of reaction time varies with the reaction temperature conditions other than those described impart little additional advantage to the reaction. Usually the course of the reaction is followed by the appearance of a $\gamma$-lactone band at 5.6$\mu$ in the infrared spectrum of the reaction mixture.

As indicated herebefore the ruthenium tetroxide oxidizing agent reacts with many organic moieties such as hydroxyl groups as well as unsaturated or benzenoid systems therefore any hydroxyl groups or unsaturated centers of the steroidal epoxide must be protected such as forming the esters having a non-reactive acyl moiety such as an alkanoyl group as illustrated. The oxidation reaction is a mild reaction which gives high yields of the selectively oxidized product, for instance a 20,21-diacyloxy-11-hydroxy-3-keto-pregnan-18-oic acid, 11,18-lactone derivative as illustrated by Formula II.

These compounds have diuretic activity in their own right but are further converted to diuretically active compounds related to known compounds by inserting the double bond and 20-keto moieties using known methods.

The epoxide starting materials of Formula I are prepared by reactions described in copending applications. Briefly however the synthetic route is as follows:

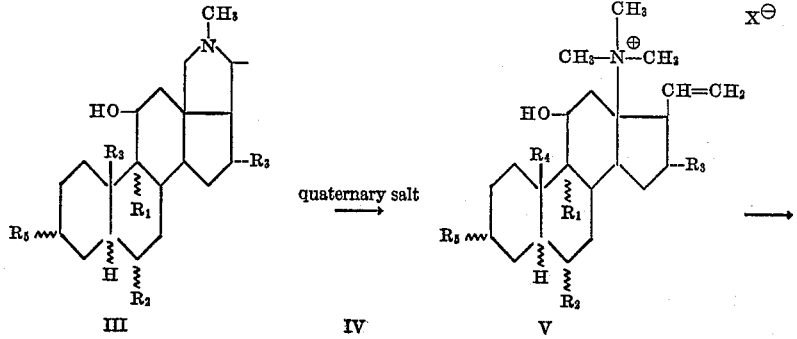

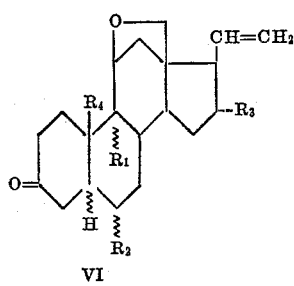
VI

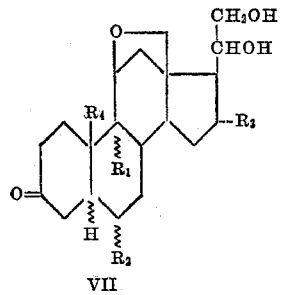
VII → I in which $R_1$–$R_4$ and ⦃ are as described; $R_5$ is hydroxy, acetoxy or, when taken together with the carbon to which it is attached, keto; and $X^\ominus$ is chosen from hydroxyl or a reactive halide such as iodide or bromide.

The overall process uses as starting materials the hydroxide quaternary salts of the conanines of Formula III. The conanines themselves are either known or are prepared from 20-keto compounds with free $C_{18}$ groups having any desired configuration or substitution in the steroidal nucleus. These 20-keto compounds are reacted with an excess of a primary lower alkylamine under mild hydrogenation conditions using platinum oxide catalyst. The resulting 20-monoalkylamine is treated with a halogenating agent, such as N-chlorosuccinimide, to give the 20-(N-haloamine) which is, in turn, irradiated with ultraviolet light in the presence of trifluoroacetic acid to give the desired base of the starting material, an N-alkyl conanine derivative. The conanine is converted into a quaternary derivative, usually with a reactive alkyl halide, such as a lower alkyl iodide, preferably the methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until the halide ion is exhausted. More specifically, the quaternary conanine of Formula IV (the anion being a halide) dissolved in an organic solvent in which it is soluble and nonreactive, such as the preferred lower alkyl alcohols, for instance methanol or ethanol, is reacted with an excess of the hydroxide form of an anion exchange resin. Exemplary of the resins (halide form) which can be used are the preferred Amberlite IRA-400, as well as Amberlite IRA-401, Amberlite IRA-410, Amberlite IRA-411, Dowex 1, Dowex 2, Imac S-3 and others. Full descriptions of these resins, including what is known of their sources and chemical characteristics are found in "Ion Exchange Resins" by Kunin, 2nd edition, John Wiley, pages 89–96 and "Ion Exchangers in Organic and Biochemistry" by Calmon and Kressman, Interscience, pages 116–129. Exemplary of the preparation of the anion exchange resins used are those disclosed by U.S. Patents No. 2,591,573, No. 2,689,833, No. 2,689,-832 and No. 2,725,361, particularly those of the example of No. 2,591,573 and Example 1 of No. 2,689,833.

The preferred manner of reaction is to pass the quaternary steriod in alcoholic solution over the hydroxide form of the resin in a typical column form, washing the resin with more solvent until the eluate is neutral. The alcohol is then evaporated to leave the steroidal quaternary hydroxide of Formula IV when $X^\ominus$ is $OH^\ominus$. This material, is heated, preferably under vacuum, until the effervescence ceases. The heating period is carried out advantageously from about 150–250° C. at low vacuum, such as from about 5–200 mm. pressure. Preferred conditions are at about 180° C. under about 10–50 mm. pressure. The reaction time is usually about two-to-three minutes to four hours, preferably about 10 minutes to about one hour. The residue is then the crude 18-dialkyl-amino-$\Delta^{20}$-steroid base of Formula V.

This tertiary amine is quaternized by reaction with a reactive lower alkyl halide in an organic, usually highly polar, solvent in which the reactants are substantially soluble and nonreactive, such as acetonitrile, ethanol, methanol, benzene, dimethylformamide or dimethylacetamide, at temperatures of from about 50–150° C. for 1 to 24 hours, preferably in acetonitrile at reflux. The resulting quaternary salt is optionally converted to the hydroxide by passing over the hydroxide form of an anion exchange resin as outlined hereabove.

The quaternary salt starting material of Formula V essentially containing a β-hydroxyl substituent in the 11-position and a trialkylammonium cation at the 18-position is reacted with an excess of an alkaline reagent in a polar organic solvent, preferably anhydrous, in which the reactants are substantially soluble as well as with which the reactants are nonreactive and which additionally is a strongly ionizing solvent such as the simple liquid formamides and acetamides as well as their N-lower alkyl derivatives having one or two N-alkyl substituents of from 1 to 4 carbon atoms, acetonitrile or a lower alkyl alcohol such as methanol or ethanol. The preferred solvents are anhydrous N,N-dimethylformamide and N,N-dimethylacetamide.

The alkaline reagent can be any strong base that converts the 11β-hydroxyl group of the steroid into a 11-alkoxide anion. Exemplary are the lower alkali metal alkoxides of up to 6 carbon atoms especially sodium methoxide, sodium ethoxide, sodium tert.-butoxide and their potassium analogues, the alkali metal amides especially sodium amide, lithium amide or potassium amide, the alkali metal hydrides especially lithium hydride or sodium hydride or the alkali metal hydroxides such as sodium or potassium hydroxide. The alkoxides are preferred. Usually an excess of the alkali is used however the proportion of reactants can vary widely.

The reaction is run at temperatures of from about 50–250° C. preferably from about 75–175° C. but of course not exceeding the boiling point of the solvent. The reaction proceeds rapidly often being essentially complete within about 2–3 hours. Usually reaction time is from about 5 to 60 minutes. Temperatures and reaction times outside of these ranges have been found to have little additional advantage.

When the reaction is run as described above the 11β-alkoxide ion displaces the 18-trimethylammonium cation to result in the formation of an 11,18-epoxy moiety which might be said to have a fundamental tetrahydrofuran structure as can be noted in Formula VI. This novel displacement reaction is independent of configuration and substituents other than at the 11 and 18 positions, particularly in the A, B rings of the steroid nucleus. Therefore any substituents stable under the alkaline conditions of the reaction can be optionally present. Starting materials have a 3-acyloxy moiety for instance can be used but usually are hydrolyzed to the 3-hydroxy congener during the rearrangement.

The reaction sequence is then continued in order to oxygenate the 20,21-positions. The 11,18-epoxy-20 pregnen-3-ols of Formula V when $R_4$ is hydroxyl are oxidized preferably using chromic acid in virtually neutral (acetone), acidic (acetic acid) or basic (pyridine) solutions usually at room temperature under standard conditions to give the 3-keto analogues VI. Note that when $R_5$ is keto this oxidation step is of course unnecessary.

The 3-keto compounds are then oxygenated at the 20,21-positions by suitable oxidation methods. Preferably the oxidation is carried out by reaction at moderate temperatures such as from about 25–50° C. for about 10–48 hours with at least stoichiometric quantities of osmium tetroxide, and preferably an excess, in an anhydrous organic solvent unreactive with the reactants and in which the reactants are substantially soluble such as a preferred ethereal solvent for example diethyl ether, tetrahydrofuran, dioxane etc. Reaction condition other than those outlined have been found to give little further advantage. The resulting osmium esters are decomposed during the work-up of the reaction mixture such as by ethanolic sodium sulfite to give the desired 11,18-epoxy-20-pregnen-20,21-diols VII. Alternative oxidation reagents are osmium tetroxide plus organic iodoso compounds (Canadian Patent No. 567,479), potassium permanganate in pyridine or osmium tetroxide-potassium perchlorate. Many of these reagents are less desirable because of degradation of other parts of the steroid nucleus due to side oxidation reactions.

The diols are then acylated prior to oxidation by the process of this invention to protect the sensitive diol moiety usually using an excess of an alkanoyl halide or anhydride of up to and including 7 carbon atoms, preferably acetic anhydride, with tertiary base usually in liquid tertiary base as pyridine at room temperature or with slight warming such as about 25–100° C. In certain cases a diluent can be used such as ether, ethyl acetate etc. The pyridine solution is quenched in water to give the diacyl starting materials of Structure I.

In the above description the terms "pregnane" or "pregnene" are used generically to include corresponding allo or 19-nor structures as well as the normal series. The term "conanine" is used to define steroidal compounds which are pyrrolidine derivatives closed at the 18,20-positions having 20α or 20β as well as 5α or 5β configurations as well as N-lower alkyl substituents thereof. The ring substituents shown in the formulas are illustrative of those nonreactive to ruthenium tetroxide which can be present during the process of this invention and, of course, can be varied at will. The reduction of the Δ⁴ containing progesterone starting material, a very useful process for preparing the initial 20-keto starting material used to prepare the conanines, gives mixtures of allo and normal pregnanes, mostly allo. The term "epoxy" is used to mean a 5 or 6 membered ethereal ring having one oxygen member and 4 or 5 carbon members such as a tetrahydrofuran or tetrahydropyran ring condensed into the steroidal nucleus.

The following examples are illustrative of the process of this invention. The process can be carried out on a wide range of epoxide starting materials which are generally inert under the reaction conditions as described herebefore.

*Example 1*

A solution of 100 g. of 3β-hydroxy-11,20-allopregnanedione in 1 l. of absolute alcohol containing an excess of methylamine is allowed to stand at room temperature for one hour. Platinum oxide (3.0 g.) is added and the mixture is shaken with hydrogen at atmospheric pressure until one mole of hydrogen is absorbed. The catalyst is removed by filtration and the filtrate is taken to dryness in vacuo. The solid syrup obtained is suspended in acetone and filtered. The solid is dissolved in glacial acetic acid, diluted with a large volume of water and extracted with ether. The aqueous layer is adjusted to pH 11 with 40% sodium hydroxide solution. The solid which precipitates is filtered and dried in vacuo over phosphorus pentoxide. The pure product 3β-hydroxy-20-methylamino-11-allopregnanone is obtained by recrystallization from toluene, M.P. 187–189° C. $[\alpha]_D^{25}=55.9°$ (c.=1.00 in chloroform). A solution of 12.1 g. of 3β-hydroxy-20-methylamino-11-allopregnanone in 600 ml. of methylene chloride is stirred with 600 ml. of 5% sodium hypochlorite solution for one hour, when the hypochlorite is removed and the treatment is repeated. The chloroform layer is separated, washed with water, dried and evaporated to yield 13.3 g. of colorless solid, 3β-hydroxy-20-(N-methyl-N-chloroamino)-11-alloprenanone.

The N-chloroamine is dissolved in 130 ml. of redistilled trifluoroacetic acid is subjected to ultraviolet irradiation under nitrogen atmosphere for 40 minutes. The trifluoroacetic acid is evaporated in vacuo and the residual 3β-hydroxy-18-chloro-20-methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3β-acetoxy-11-ketoconanine. Recrystallization from ethanol affords colorless needles, M.P. 186–189° C., $[\alpha]_D^{25}=83.0°$ (c.=1.00).

A solution of 25 g. of 3β-acetoxy-11-ketoconanine in 300 ml. of tetrahydrofuran is added dropwise to a stirred solution of 11.6 g. of lithium aluminum hydride in 300 ml. of refluxing tetrahydrofuran. The mixture is stirred at reflux for one hour. After quenching with 46.4 ml. of water, the separated material is removed by filtration. The filtrate is concentrated to dryness on a rotating evaporator to leave a green oil. After dissolving the oil in 50 ml. of methanol and water is added, the crystalline solvate, 3β,11β-dihydroxyconanine, is obtained, M.P. 100–104° C.

A mixture of 18.5 g. of the dihydroxy-conanine, 25.3 ml. of methyl iodide and 108 ml. of benzine is heated at reflux for two hours. An off-white crystalline precipitate forms. The mixture is diluted with ether and filtered. The filter cake is recrystallized from methanol to give 3β,11β-hydroxyconanine methiodide, M.P. 227–279° C.

A solution of 82 g. of the methiodide in 350 ml. of methanol is passed through a column containing 251 g. of IRA–400 resin (hydroxide form). The methanolic eluate is evaporated under reduced pressure. The oily residue is heated to 170° C. and maintained there for 15 minutes. The residue after trituration with methanol is 18-dimethylamino-20-allopregnen-3β,11β-diol.

A solution of 52.9 g. of the 18-dimethyl-amino-20-allopregnene and 29 ml. of methyl iodide in 3 l. of acetonitrile is heated at reflux for 18 hours. The precipitate is the methiodide, M.P. 260° C.

A solution of 10 g. of 18-dimethylamino-20-allopregnen-3β, 11β-diol methiodide in 100 ml. of dimethylformamide is treated with 10 g. of sodium methoxide and gently heated to reflux over an open flame. After 10 minutes, the reaction mixture is heated on a steam cone for 30 minutes, poured into 100 ml. of water, chilled and filtered. Recrystallization of the resulting solid from 70% methanol gives 11,18-epoxy-20-allopregnen-3β-ol, M.P. 144–145° C. Reaction of the 3β-ol (500 mg.) with an excess of acetic anhydride in pyridine with warming then quenching in water gives the acetate derivative.

The epoxy compound (330 mg.) in 5 ml. of acetone is treated with 0.28 ml. of 4 M chromic acid solution. The mixture is quenched in 50 ml. of water and several ml. of ethanol then chilled to give white crystals of 11,18-epoxy-20-allopregnen-3-one, M.P. 169–171° C.

A mixture of 3.6 g. of the epoxyallopregnenone, 3 g. of osmium tetroxide and 200 ml. of absolute ether is reacted for 48 hours. The black osmium ether is suspended in 300 ml. of 60% aqueous ethanol containing 24 g. of sodium sulfite, refluxed for 4 hours and filtered. The filtrate is evaporated and the residue stirred with methylene chloride. The extract is washed with water dried and evaporated to give, after recrystallization from ethyl acetate, 11,18-epoxyallopregnan-20,21-diol-3-one, M.P. 212–215° C.

A solution og 920 mg. of the diol, 2 ml. of acetic anhydride and 2 ml. of pyridine is heated at 90° C. for 30 minutes.

A solution of 615 mg. of 11,18-epoxy-20,21-diacetoxyallopregnan-3-one in 15 ml. of carbon tetrachloride is treated with a slight excess of ruthenium tetroxide in carbon tetrachloride by standing at room temperature for 72 hours. The solution is filtered and the filtrate evaporated to give a residue of colorless needles, 20,21-diacetoxy-11$\beta$-hydroxy-3-ketoallopregnan-18-oic acid, 11,18-lactone, M.P. 225–229° C.

This compound (5 g.) is brominated and treated with sodium iodide-hydriodic acid to give the $\Delta^4$ compound. The 20,21-diacetate groups (64 mg. of compound) are removed in methanolic potassium carbonate bicarbonate to give the diol which (60 mg.) is monoacetylated and (36 mg.) oxidized with chromic acid to give the desired 21-acetoxy-11$\beta$-hydroxy-3,20-diketo-4-pregnen-18-oic acid, 11,18-lactone, M.P. 193° C. all using known procedures.

Example 2

A mixture of 4 g. of lithium aluminum hydride, 8 g. of 3$\beta$-hydroxy-6$\alpha$-fluoro-11-keto-conanine (prepared by reduction of the known 11-keto-6$\alpha$-fluoroprogesterone (25 g.) with palladium-on-charcoal and then sodium borohydride to give 6$\alpha$-fluoroallopregnan-3$\beta$-ol-11,20-dione then to the conanine as described in Example I) and 300 ml. of tetrahydrofuran is prepared and then heated at reflux for two hours. The mixture is then quenched in 30 ml. of water. The metal precipitate is separated then the filtrate is evaporated to leave an oil which is 3$\beta$,11$\beta$-dihydroxy-6$\alpha$-fluoroconanine. This material (3 g.) is reacted with 4.5 g. of methyl bromide in 50 ml. of benzene at reflux for 5 hours. The methobromide separates as a solid and is collected by filtration. The methobromide (2.5 g.) dissolved in methanol (100 ml.) is passed over a column containing IRA–400 resin (hydroxide form). The methanolic eluate is evaporated and the oily residue is heated to 185° C. on an oil bath. After evolution of gas is complete, the desired 18-dimethylamino-6$\alpha$-fluoro-20-allopregnen-3$\beta$, 11$\beta$-diol remains. This compound (2 g.) is quaternized by heating with 20 ml. of ethyl bromide in acetonitrile for 12 hours. The resulting solid is the desired ethobromide starting material.

A mixture of 1 g. of the ethobromide in 15 ml. of dimethylacetamide is treated with 1 g. of potassium tert. butoxide and heated to about 150° C. then on the steam bath for one hour. The product is isolated by quenching in water and recrystallizing the solid from methanol, 11,18-epoxy-6$\alpha$-fluoro-20-allopregnen-3$\beta$-ol. The pregnenol (0.68 g.) in 15 ml. of acetone is oxidized with 0.60 ml. of standardized 4 M chromic acid solution. The mixture is poured into water-ethanol and chilled to give the 3-keto compound.

A mixture of 1.8 g. of 11,18-epoxy-6$\alpha$-fluoro-20-allopregnen-3-one and 2 g. of osmium tetroxide in 200 ml. of absolute dioxane is held at 50° C. for 24 hours. The mixture is filtered. The osmium ether is refluxed in a suspension of 12 g. of sodium sulfite in 150 ml. of aqueous methanol for 6 hours. The filtrate is evaporated to dryness then the residue taken through methylene chloride to give 11,18-epoxy-6$\alpha$-fluoroallopregnan-20,21-diol-3-one. The diol (1 g.) is acylated with 2 ml. of propionic anhydride in pyridine at room temperature overnight. After quenching the dipropionate ester is obtained.

A mixture of 1 g. of 20,21-dipropionyloxy-11,18-epoxy-6$\alpha$-fluoroallopregnan-3-one, a slight excess over the stoichiometric amount of ruthenium tetroxide in carbon tetrachloride is heated at reflux for 8 hours. The filtered solution is cooled and evaporated to leave a residue of 20,21-dipropionyloxy-6$\alpha$-fluoro-11$\beta$-hydroxy-3-ketoallopregnan-18-oic acid, 11,18-lactone.

Substituting known 6$\beta$-fluoro-11-keto-progesterone for the 6$\alpha$-isomer above, isolating the 6$\beta$-fluoropregnan-11,20-dion-3$\alpha$-ol from the known reduction reactions and carrying this starting material through the conanine as in Example 1 gives 11,18-epoxy-6$\beta$-fluoropregnan-20,21-diol-3-one as the diacetate. Continuing the reaction by oxidation of 1 g. of the acetate with an excess of ruthenium tetroxide in carbon tetrachloride at 40° C. for 36 hours gives the desired 11,18-lactone with a 6$\beta$-fluoro substituent.

Example 3

A mixture of 8 g. of 3$\alpha$,11$\beta$-dihydroxy-6$\beta$-methyl-pregnan-20-one and 0.25 g. of platinum oxide in 100 ml. of ethanol and an excess of ethylamine is hydrogenated until the theoretical amount of hydrogen has been absorbed. Working up as in Example 1 gives the 20-ethylamino compound which (7 g.) is reacted with hypochlorite solution, irradiated in trifluoroacetic acid and reacted with alkali in succession as in Example 1 to give N-ethyl-3$\alpha$,11$\beta$-dihydroxy-6$\beta$-methyl-5$\beta$-conanine.

This compound (1.5 g.) is reacted with ethyl iodide and then passed over an anion exchange resin to form the quaternary hydroxide as in Example 1. Heating the salt at 200° C. at 100 mm. gives 3$\alpha$,11$\beta$-dihydroxy-6$\beta$-methyl-18-dimethylamino-20-pregnene, which is quaternized with ethyl iodide.

A solution of 15 g. of 18-dimethylamino-6$\beta$-methyl-20-pregnen-3$\alpha$,11$\beta$-diol ethiodide in 200 ml. of dimethylformamide is treated with 15 g. of potassium ethoxide and gently refluxed for 15 minutes. After heating at 100° C. for one hour, the reaction mixture is poured into 200 ml. of water, cooled and filtered. The recrystallized solid is 11,18-epoxy-6$\beta$-methyl-20-pregnen-3$\alpha$-ol.

The epoxy compound (3.4 g.) in 50 ml. of glacial acetic acid is treated with 3 ml. of 4 M chromic acid solution. The mixture is quenched in 250 ml. of water and alcohol then cooled to give 11,18-epoxy-6$\beta$-methyl-20-pregnen-3-one. A mixture of 3 g. of the ketone, 2.5 g. of osmium tetroxide and 300 ml. of ether is reacted at 25° C. for 24 hours. The osmium ester is separated and decomposed with sodium sulfite in aqueous methanol by refluxing for 3 hours. The methylene chloride extract from the residue extraction gives 11,18-epoxy-6$\beta$-methyl-pregnan-20,21-diol-3-one. This compound (1 g.) is diacetylated by reaction with 2 ml. of acetic anhydride in 3 ml. of pyridine. Quenching in water gives the diacetate.

A mixture of 3 g. of 20,21-diacetoxy-11,18-epoxy-6$\beta$-methylpregnan-3-one, with an excess of ruthenium tetroxide in 100 ml. of carbon tetrachloride is allowed to stand for 36 hours. The mixture is filtered and the filtrate evaporated to give crystals of 20,21-diacetoxy-11$\beta$-hydroxy-6$\beta$-methyl-3-ketopregnan-18-oic acid, 11,18-lactone. The lactone (1 g.) is treated with bromine dimethylformamide, then collidine to give the $\Delta^4$ analogue which (750 mg.) is then hydrolyzed to the diol, monoacetylated and oxidized following the procedures of Example 1 to give 21-acetoxy-11$\beta$-hydroxy-3,20-diketo-6-$\alpha$ and $\beta$-methyl-4-pregnen-18-oic acid, 11,18-lactones.

Example 4

Using the same procedure as in Example 1, but using methylamine and methyl iodide reactants in excess, 3$\alpha$,11$\beta$-dihydroxypregnan-20-one (7 g.) is converted to N-methyl-3$\alpha$,11$\beta$-dihydroxy-5$\beta$-conanine. This compound (1.4 g.) is quaternized with an excess of methyl iodide, converted to the hydroxide, decomposed by heating at 180° C. at 15 mm., and requaternized using methyl iodide.

A mixture of 5 g. of 18-dimethylamino-20-pregnen-3α, 11β-diol methiodide and 5 g. of sodium methoxide in 50 ml. of dimethylacetamide is heated to 150° C. for 10 minutes, then poured into an ice slurry to separate 11,18-epoxy-20-pregnen-3α-ol.

This compound (3.3 g.) is oxidized with an acetone solution with 2.8 ml. of 4 M chromic acid solution to give, after quenching, 11,18-epoxy-20-pregnen-3-one. The olefin (1.8 g.), 1.5 g. of osmium tetroxide and 100 ml. of ether is reacted for 24 hours to give, after decomposing the osmium ester, 11,18-epoxypregnan-20,21-diol-3-one. Acetylation of the diol (1.3 g.) with an excess of acetic anhydride in pyridine gives the diacetate. One portion of the diacetate (500 mg.) in carbon tetrachloride is oxidized with an excess of ruthenium tetroxide (750 mg.) at 30° C. for 48 hours to give 20,21-diacetoxy-11β-hydroxy-3-ketopregnan-18-oic acid, 11,18-lactone.

*Example 5*

A mixture of 17.3 g. of 3α-hydroxy-16α-methyl-11,20-pregnanedione and 0.5 g. of platinum oxide in 200 ml. of ethanol containing about 10% w./w. of methylamine is hydrogenated until the theoretical hydrogen absorption has occurred. The catalyst is filtered off and the filtrate is evaporated to dryness. The residue is taken up in chloroform, extracted with dilute acetic acid and the acid extract is made basic with dilute sodium hydroxide. Recrystallization of the separated free base gives 3α-hydroxy-16α-methyl - 20α - methylaminopregnan - 11 - one. This compound (13 g.) is reacted with hypochlorite as in Example 1 to give 3α-hydroxy-16α-methyl-20-(N-methyl-N-chloroamino)-pregnan-11-one which is dissolved in 150 ml. of trifluoroacetic acid and irradiated with ultraviolet light for 40 minutes. The solvent is evaporated to give the N-chloro compound. After treatment with alcoholic potassium hydroxide and working up as in Example 1 without the acylation step, 3α-hydroxy-16α-methyl-11-keto-5β-conanine is obtained.

A mixture of 12.5 g. of the 3α-hydroxy-16α-methyl-11-keto-5β-conanine, 5.8 g. of lithium aluminum hydride in 300 ml. of tetrahydrofuran is heated at reflux for one hour. The 11-hydroxy material is obtained by quenching and evaporating the filtrate. It is then converted to the methiodide, to the hydroxide form, heated and requaternized as in Example 1 to form 18-dimethylamino-16α-methyl-20-pregnen-3α,11β-diol methiodide.

A mixture of 15 g. of this compound, 15 g. of sodium methoxide and 150 ml. of dimethylformamide is reacted as in Example 1 to give 11,18-epoxy-16α-methyl-20-pregnen-3α-ol which (11 g.) is in turn oxidized with chromic acid solution to give the 3-ketone. A mixture of 7.2 g. of this compound, 6 g. of osmium tetroxide and 500 ml. of ether is reacted for 48 hours. The osmium ester is decomposed by refluxing in 500 ml. of aqueous alcohol containing 36 g. of sodium sulfite to give 11,18-epoxy-16α-methylpregnan-20,21-diol-3-one. The diol is acetylated (4.6 g.) with 3 ml. of acetic anhydride in 20 ml. of pyridine to give the 20,21-diacetate.

A mixture of 30 g. of 20,21-diacetoxy-11,18-epoxy-16α-methylpregnan-3-one, 30 g. of ruthenium tetroxide and 150 ml. of carbon tetrachloride is heated at 50° C. for 24 hours. The reaction filtrate is evaporated to give 20,21-diacetoxy-11β-hydroxy - 16α - methyl - 3 - ketopregnan-18-oic acid, 11,18-lactone. This compound (20 g.) monobrominated, dehydrobrominated, hydrolyzed, monoacetylated and oxidized with chromic acid in acetone as described above to give 21-acetoxy-11β-hydroxy-16α-methyl-3,20-diketo-4-pregnen-18-oic acid, 11,18-lactone.

*Example 6*

A solution of 5 g. of 3β-acetoxy-9(11)-allopregnen-20-one [J. Org. Chem., 16, 1278 (1951)] in 500 ml. of dioxane and 75 ml. of water is treated with N-bromoacetamide and 77 ml. of 1.5% aqueous perchloric acid. After 20 minutes at 27° C., the excess N-bromoacetamide is destroyed with aqueous sodium pyrosulfite. The pH is adjusted to 11. The resulting solution is allowed to stand for 30 minutes, then acidified with glacial acetic acid and evaporated in vacuo. When the dioxane is off the reaction mixture, the residue is diluted with water. The crude product is collected and acetylated with pyridine and acetic anhydride at 100° C. The cooled mixture is poured into water. The solid is collected and recrystallized to give 3β-acetoxy-9β,11β-epoxyallopregnan-20-one. This compound (5 g.) in 500 ml. of chloroform and 25 ml. of ethanol is mixed with 6 g. of anhydrous hydrogen fluoride. After standing at ambient temperature for 6 hours, the reaction mixture is poured into 5% sodium bicarbonate. The product is extracted into chloroform to give 3β-acetoxy-9α-fluoroallopregnan-11β-ol-20-one. This compound (3 g.) in 100 ml. of acetic acid is oxidized with 1 g. of chromic acid for 1 hour at 27° C. The solution is quenched and extracted with chloroform to give the 11-one. This compound (2.8 g.) in 75 ml. of ethanol containing 10% w./w. of methylamine is shaken under hydrogen with 200 mg. of platinum oxide until the theoretical amount of hydrogen is absorbed. The mixture is diluted with ethanol, filtered and the filtrate evaporated to leave the 20-methylamino compound. This compound (13 g.) in 200 ml. of chloroform is stirred with 300 ml. of 5% sodium hypochlorite solution for 30 minutes. The chloroform layer is separated, washed and evaporated to leave 3β-acetoxy-9α-fluoro-20α-methylchloroaminoallopregnan-11β-one. The chloramine (8.4 g.) is dissolved in 80 ml. of trifluoroacetic acid and irradiated for 45 minutes. The solvent is evaporated and the residue taken up in methanol, made basic and heated at reflux for six hours. The chloroform extracted residue is taken to dryness to give 3β-hydroxy-11-keto-9α-fluoroconanine. This material (6 g.) is reduced with lithium aluminum hydride in tetrahydrofuran as described above to give the 11-ol. The conanine (3 g.) is reacted with 2 ml. of methyl iodide in 300 ml. of benzene at reflux for three hours. The resulting methiodide in methanol is passed over an Amberlite IRA–44 column (hydroxide form). The residue from the methanolic eluates is heated at 190° C. at 25 min. until gas formation stops to give 9α-fluoro-18-dimethylamino-20-allopregnen-3β,11β-diol. This compound (1 g.) is quaternized with methyl iodide in acetonitrile.

The quaternary salt (5 g.) is treated with 5 g. of sodium methoxide in 50 ml. of dimethylformamide as in Example 1 to give 9α-fluoro-11,18-epoxy-20-allopregnen-3β-ol. This compound (3.5 g.) is oxidized with 2.8 ml. of chromic acid solution in acetone. After quenching the 3-ketone is obtained and a mixture of 2 g. of the ketone, 1.5 g. of osmium tetroxide and 150 ml. of ether is reacted for 48 hours. The osmium ester is decomposed by sodium sulfite in methanol to give 11,18-epoxy-9α-fluoroallopregnan-20,21-diol-3-one. This compound is acetylated with an excess of acetic anhydride in pyridine to give the diacetate.

A mixture of 1 g. of the diacetate, an excess of ruthenium dioxide and 75 ml. of carbon tetrachloride is reacted at 40° C. for 48 hours. The filtered solution is evaporated to leave 20,21-diacetoxy-9α-fluoro-11β-hydroxy-3-ketoallopregnan-18-oic acid, 11,18-lactone. This lactone (3 g.) is brominated with 11 ml. of 1.8 M hydrogen bromide and 1.65 g. of bromine in acetic acid, then reacted with sodium iodide-hydriodic acid to give the Δ⁴ compound. This compound (2.5 g.) is hydrolyzed in methanolic carbonate, mono acetylated with one equivalent of acetic anhydride in pyridine and oxidized with chromic acid in acetone at room temperature to give 21-acetoxy-9α-fluoro-11β-hydroxy-3,20-diketo-4-pregnen-18-oic acid, 11,18-lactone. The alcohol is prepared by hydrolysis of the acetate in methanolic hydrochloric acid solution.

Example 7

A solution of 20 g. of 19-nor-4-pregnen-3,11β-diol-20-one (U.S. Patent No. 2,878,267) in 250 ml. of methanol with 2 g. of 5% palladium-on-charcoal is hydrogenated at low pressure and room temperature until one mole equivalent of hydrogen is absorbed. The catalyst is removed and the filtrate evaporated to give 19-norallopregnan-3β,11β-diol-20-one [alternatively prepared by the two stage reduction procedure of Example 8 of the known 11β-hydroxy-19-norprogesterone described by Bowers et al., Tetrahedron, 2, 165 (1958)] which is converted to the 3-acetate by treatment with one mole of acetic anhydride in pyridine. This compound (18 g.) is taken up in 250 ml. of ethanol containing 15 g. of butylamine and allowed to stand for five hours. The clear solution is shaken with 1 g. of platinum oxide catalyst at 50 p.s.i. of hydrogen. When one mole equivalent of hydrogen is absorbed, the catalyst and alcohol are removed. The residue is taken through acid-ether treatment. The acid extracts are neutralized and extracted with ether. The ether extracts are washed with salt solution dried and evaporated to yield the acetate of 19-nor-20-butylaminopregnan-3β,11β-diol. A mixture of 15 g. of the secondary amine in acetic acid is reacted slowly with chromic acid in acetic acid solution. The mixture is quenched in water to give the dione. This 11-keto compound (6 g.) in 350 ml. of chloroform is stirred with 350 ml. of 5% sodium hypochlorite solution for two hours. The chloroform layer is removed and worked up to give the N-chloroamine. A solution of 7 g. of the N-chloromine in 75 ml. of trifluoroacetic acid is irradiated for 60 minutes. The solvent is evaporated to leave the crude 18-chloro compound which is taken up in 100 ml. of methanol and made strongly basic with 25% methanolic potassium hydroxide. After a reflux period of 8 hours, the mixture is evaporated, poured into water and taken through chloroform to give the crude N-butyl-19-nor-3-hydroxy-11-ketoconanine. This compound (2.5 g.) is reduced with an excess of lithium aluminum hydride in tetrahydrofuran as in Example 1 to give the 11β-hydroxy-19-nor-conanine.

A mixture of 5 g. of the conanine and 7 ml. of butyl iodide in benzene is refluxed for 6 hours to give the quaternary salt which is taken up in methanol and passed over a hydroxide resin as described above to give the quaternary hydroxide. The hydroxide is heated at 185° C. under 15 mm. pressure until effervescence stops to form 18-dibutylamino-19-nor-20-allopregnen-3β,11β-diol. This compound (5 g.) is reacted with 5 g. of ethyl bromide in acetonitrile to form the quaternary ethobromide.

The ethobromide (5 g.) in 50 ml. of dimethylformamide with 5 g. of potassium methoxide is heated gently with a flame shortly and then on the steam bath for two hours.

The mixture is quenched to separate 11,18-epoxy-19-nor-20-allopregnen-3β-ol.

The epoxy compound (4 g.) in 100 ml. of acetone is treated with 3.5 ml. of 4 M chromic acid solution. Quenching gives 11,18-epoxy-19-nor-20-allopregnen-3-one. This compound (3.5 g.), 3 g. of osmium tetroxide and 250 ml. of absolute ether is reacted for 36 hours. The ester is refluxed in 350 ml. of sodium sulfite solution for 5 hours. The reaction filtrate is evaporated and the residue extracted into methylene chloride to yield 11,18-epoxy-19-norallopregnan-20,21-diol-3-one. The diol (2 g.) is acetylated with 5 ml. of acetic anhydride in 10 ml. of pyridine to give 11,18-epoxy-20,21-diacetoxy-19-norallopregnan-3-one.

A solution of 3 g. of the diacetoxy intermediate in 100 ml. of carbon tetrachloride is treated with a slight excess of ruthenium tetroxide at 25° C. for 48 hours. The reaction filtrate is evaporated to give 20,21-diacetoxy-11β-hydroxy-3-keto-19-norallopregnan-18-oic acid, 11,18-lactone.

Substituting 6α-fluoro-19-nor-allopregnan-3β-ol-11,20-dione (prepared as described in U.S. Patent No. 2,838,492) in stoichiometric amounts in the amination and cyclization reactions as above to form 6α-fluoro-19-nor-3β-hydroxy-11-ketoconanine and thence in reactions as described the following compounds are prepared; 11,18-epoxy - 6α - fluoro-19-nor-20-allopregnen-3-one, 11,18-epoxy-6α-fluoro-19-norallopregnan-3-on-20,21-diol and its diacetate.

A mixture of 1 g. of the diacetate and an excess of ruthenium tetroxide in ethylene dichloride is heated at 50° C. for 24 hours. The filtered solution is evaporated to give the desired 20,21-diacetoxy-6α-fluoro-11β-hydroxy-3-keto-19-norallopregnan-18-oic acid, 11,18-lactone.

Example 8

A solution of 0.2 mole of 6β,9α-difluoro-4-pregnen-3,11,20-trione (U.S. Patent No. 2,880,205) in 750 ml. of methanol with 2 g. of 5% palladium-on-charcoal is hydrogenated at low pressure and ambient temperature until one molar equivalent of hydrogen is absorbed. The catalyst is removed and solvent evaporated to give 6β,9α-difluoro-allopregnan - 3,11,20 - trione. This compound (0.17 mole) in 4.5 l. of methanol is mixed over a period of 10 minutes with a mixture of 1.5 l. of methanol, 50 ml. of 2.5 N sodium hydroxide solution and 1.8 l. of 0.18 molar sodium borohydride in pyridine. The mixture is diluted with an excess of concentrated hydrochloric acid then extracted into ether. The ether extracts are washed, dried and evaporated to leave 6β,9α-difluoroallopregnan-3β-ol-11,20-dione. The dione is acetylated with an excess of acetic anhydride in pyridine at 25° C. for 6 hours. A suspension of 20 g. of the acetate compound in 450 ml. of ethanol containing about 15 g. of methylamine is hydrogenated with platinum oxide catalyst as in Example 1 to give 6β,9α-difluoro-20-methylaminoallopregnan-3β-ol-11-one acetate. This compound (12 g.) in chloroform is reacted with 500 ml. of 5% sodium hypochlorite solution to give the chloroamine which irradiated in trifluoroacetic acid, then refluxed for 6 hours with 25% methanolic potassium hydroxide to give 6β,9α-difluoro-3β-ol-11-keto conanine. This compound (5 g.) is reduced with lithium aluminum hydride in tetrahydrofuran as in Example 1 to the 11β-hydroxyconanine.

A mixture of 6 g. of the conanine and 7 ml. of methyl iodide in benzene is refluxed for two hours to give the methiodide which is exchanged over a hydroxide anion exchange column as described before to give the quaternary hydroxide. This compound is heated to 170° C. under 10 mm. pressure to give the olefin which is requaternized with methyl iodide in acetonitrile to give 6β,9α-difluoro-18-dimethylamino - 20 - allopregnen - 3β,11β-diol methiodide.

A mixture of 7 g. of the methiodide in 75 ml. of dimethylformamide with 5 g. of sodium methoxide is heated gently with a flame for 5 minutes, then on the steam bath for 30 minutes. Quenching gives the desired 11,18-epoxy-6β,9α-difluoro-20-allopregnen-3β-ol. The epoxy compound (5 g.) is oxidized with chromic acid in acetone solution to give the 3-one which (4 g.) is oxidized with 3 g. of osmium tetroxide in 350 ml. of ether at 50° C. The osmium ester is decomposed with 400 ml. of sodium sulfite solution at reflux. After methylene chloride extraction of the residue, the desired 11,18-epoxy-6β,9α-difluoro-20,21-diacetoxyallopregnen-3-one is obtained. This diol residue is acetylated with an excess of acetic anhydride in pyridine.

A solution of 5 g. of the diacetoxyepoxide in 150 ml. of carbon tetrachloride is treated with a stoichiometric quantity of ruthenium tetroxide at 50° C. for 18 hours. The reaction filtrate is evaporated to give 20,21-diacetoxy-11β-hydroxy-6β,9α-difluoro-3 - ketoallopregnan - 18 - oic acid, 11,18-lactone.

What is claimed is:

1. The process of preparing a steroidal 11-hydroxy-18-carboxylic acid lactone having a fundamental structure selected from the group consisting of pregnane, allopregnane, 19-norpregnane and 19-norallopregnane comprising oxidizing with ruthenium tetroxide a steroidal 11,18-epoxide having the same fundamental structure of said 11-hydroxy-18-carboxylic acid lactone and having an epoxy ring of 5 members said epoxy ring having a methylene group adjacent to the oxygen ring member at which methylene group the sole oxidation reaction occurs.

2. The process of claim 1 characterized in that an excess of ruthenium tetroxide is used.

3. The process of claim 1 characterized in that a liquid halogenated hydrocarbon solvent of less than 6 carbon atoms is used.

4. The process of preparing steroidal lactones having the following fundamental structure:

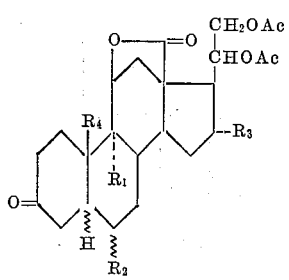

in which: $R_1$ is a member selected from the group consisting of hydrogen and fluoro; $R_2$ is a member selected from the group consisting of hydrogen, methyl and fluoro; $R_3$ and $R_4$ are members selected from the group consisting of hydrogen and methyl; Ac is lower alkanoyl of 2 to 7 carbons, and; ⌇ is a configurational position selected from the group consisting of α and β, comprising oxidizing with ruthenium tetroxide a steroidal epoxide having the following fundamental structure:

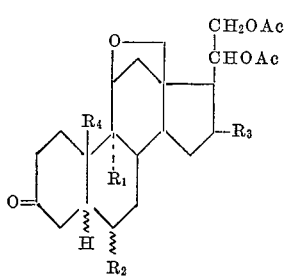

in which: $R_{1-4}$, Ac and ⌇ are as defined hereabove.

5. The method of claim 4 characterized in that an excess of ruthenium tetroxide is used.

6. The method of claim 4 characterized in that the oxidation reaction is run at from about 10° C. to about 120° C. for from about 1 hour to about 36 hours.

7. The method of claim 6 characterized in that a liquid halogenated hydrocarbon solvent of less than 6 carbon atoms is used.

8. The process of preparing a steroidal lactone having the structure:

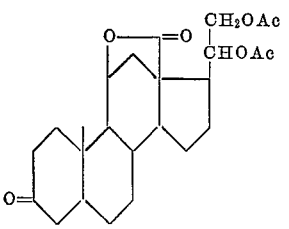

in which Ac is acetyl, comprising oxidizing with an excess of ruthenium tetroxide a steroidal epoxide having the structure:

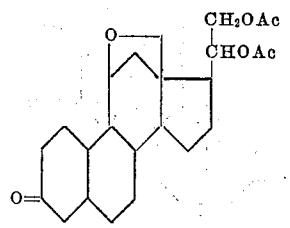

in which Ac is acetyl.

9. The process of preparing a steroidal lactone having the structure:

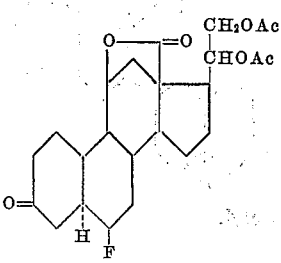

in which Ac is acetyl, comprising oxidizing with an excess of ruthenium tetroxide a steroidal epoxide having the structure:

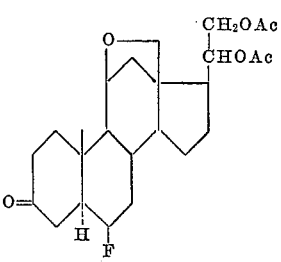

in which Ac is acetyl.

10. The process of preparing a steroidal lactone having the structure:

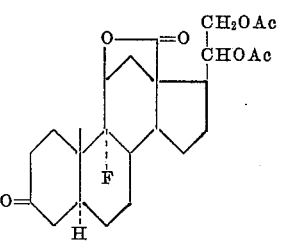

in which Ac is acetyl, comprising oxidizing with an excess of ruthenium tetroxide a steroidal epoxide having the structure:

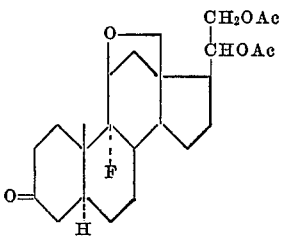

in which Ac is acetyl.

11. The process of preparing a steroidal lactone having the structure:

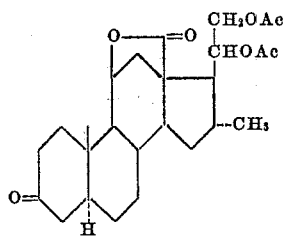

in which Ac is acetyl, comprising oxidizing with an excess of ruthenium tetroxide a steroidal epoxide having the structure:

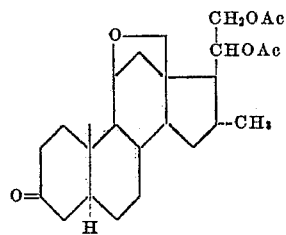

in which Ac is acetyl.

12. The process of preparing a steroidal lactone having the structure:

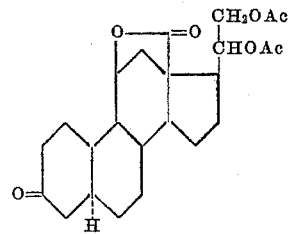

in which Ac is acetyl, comprising oxidizing with an excess of ruthenium tetroxide a steroidal epoxide having the structure:

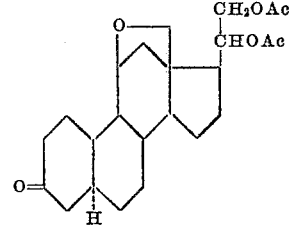

No references cited.